(12) United States Patent
Kessler et al.

(10) Patent No.: US 7,844,543 B1
(45) Date of Patent: Nov. 30, 2010

(54) MULTIPLE PROTOCOL TRADING SYSTEM

(75) Inventors: Deborah L. Kessler, Mountain Lakes, NJ (US); Daniel Cleaves, Summit, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 0 days.

(21) Appl. No.: 12/814,740

(22) Filed: Jun. 14, 2010

Related U.S. Application Data

(62) Division of application No. 11/242,821, filed on Oct. 3, 2005, now Pat. No. 7,761,365.

(51) Int. Cl.
G06Q 40/00 (2006.01)

(52) U.S. Cl. .................................. 705/37; 705/36 R

(58) Field of Classification Search ................. 705/35, 705/36 R, 37, 38, 39, 44, 30, 1
See application file for complete search history.

(56) References Cited

U.S. PATENT DOCUMENTS

| | | | |
|---|---|---|---|
| 2,134,118 A | 10/1938 | Foss | |
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,823,265 A | 4/1989 | Nelson | |
| 4,903,201 A | 2/1990 | Wagner | |
| 4,980,826 A | 12/1990 | Wagner | |
| 5,101,353 A | 3/1992 | Lupien et al. | |
| 5,136,501 A | 8/1992 | Silverman et al. | |
| 5,168,446 A | 12/1992 | Wiseman | |
| 5,297,031 A | 3/1994 | Gutterman et al. | |
| 5,710,889 A | 1/1998 | Clark et al. | |
| 5,727,165 A | 3/1998 | Ordish et al. | |
| 5,905,974 A | 5/1999 | Fraser et al. | |
| 6,278,982 B1 * | 8/2001 | Korhammer et al. | 705/36 R |
| 6,343,278 B1 * | 1/2002 | Jain et al. | 705/36 R |
| 6,421,653 B1 * | 7/2002 | May | 705/36 R |
| 2002/0169703 A1 * | 11/2002 | Lutnick et al. | 705/37 |
| 2003/0093360 A1 * | 5/2003 | May | 705/37 |
| 2004/0117331 A1 * | 6/2004 | Lutnick et al. | 705/416 |
| 2005/0256797 A1 * | 11/2005 | Tyulyaev | 705/37 |

OTHER PUBLICATIONS

Anonymous "Nasdaq banks on brand name to revive pan-European aspirations " Jun. 11, 2001 Efinancial News.*
Sales, Robert "Bloomberg Tradebook and Belzberg Technologies Develop Trading Systems Interface.(Company Business and Marketing)" Jun. 2001 Wall Street & Technology , 19 , 6 , 30.*
Sales, Robert "As PHLX revamps its trading floors, it eyes a future as a technology supplier" Jul. 2001 Wall Street & Technology v19n7 pp. 49-50.*

* cited by examiner

*Primary Examiner*—Kelly Campen
(74) *Attorney, Agent, or Firm*—Dickstein Shapiro LLP

(57) ABSTRACT

A multi-protocol trading system in which traders preferring different trading protocols may coexist within the same system, and access the same liquidity pool, while maintaining their trading rule preferences. The system supports two protocol preferences: a workup preference and a FIFO preference, and includes a single integrated order book that stores orders received from both workup and FIFO traders. Received orders are matched against orders in the order book in accordance with a FIFO and/or workup protocol, as a function of preferences selected by the traders and/or the system operator. Alternatively, the system includes a pair of order books, a workup order book and a FIFO order book. Customers submit linked orders having a workup leg and a FIFO leg which may be matched against the workup and/or FIFO order books, as a function of preferences selected by the traders and/or the system operator.

5 Claims, 13 Drawing Sheets

MULTIPLE PROTOCOL TRADING SYSTEM

CROSS REFERENCE TO RELATED APPLICATIONS

The present application is a divisional of application Ser. No. 11/242,821, filed Oct. 3, 2005, the entire contents of which are incorporated herein by reference.

FIELD OF THE INVENTION

The present invention relates to a system and method for the managed trading of securities or other items in accordance with more than one trading protocol.

BACKGROUND OF THE INVENTION

Trading in the secondary market for U.S. government securities has, for many years, been conducted in accordance with a trading convention referred to as "workup." This convention permits buyers and sellers to "work up" the size of a trade from an initial transaction quantity.

Over time, a number of distinct workup protocols have developed and been implemented by inter-dealer brokers operating in the secondary market. These include a workup protocol developed by BrokerTec USA, LLC and in use on the BrokerTec electronic trading network (ETN). In this workup protocol, an initial "hit" or "lift" by an aggressive trader commences a workup and triggers a first phase, called the "private phase." During the private phase, only orders of the aggressor (if the aggressor hits or takes all available size at the best price) and the first passive participant that was hit or lifted may transact. The orders of all other participants are queued but not executed.

When the private phase expires, a second workup phase begins, called the "public phase." During the public phase, the orders of all traders are executed on a time priority basis. After conclusion of the public phase, the workup ends and a new bid-offer market is presented to the traders.

The BrokerTec ETN is adapted to receive different types of aggressive orders called "Fill or Kill" ("FoK"), "Fill and Kill" ("FaK"), and "Fill and Store" ("FaS") orders. A FoK order is executed only if it can be completely filled. Thus, for example, if a trader submits a FoK order to buy 10 M of a particular security at par and only 8 M of that security is available at that price, no trade occurs and the order is "killed," i.e., not entered in the system's order book.

By contrast, FaK and FaS orders may be partially filled. When a FaS order is partially filled, the unfilled portion of the order is automatically converted to a new order for the unfilled size and added to the system's order book. When a FaK order is partially filled, the unfilled portion of the order is "killed" and does not result in an order for the unfilled size being placed in the system's order book following the workup.

For purposes of illustration, the system and method described herein will be primarily described in connection with the BrokerTec ETN workup protocol described above. It should be recognized, however, that the principles and concepts of the present invention may be applied more generally in connection with other workup protocols.

Workup has traditionally been justified on the ground that it provides certain benefits to market participants. These include permitting a dealer to maintain the secrecy of its trading strategy by posting a small bid or offer, rather than the true amount the dealer wishes to buy or sell. Once the quote is accepted by a second dealer, the original dealer can increase the amount or "work up" the amount of the initial quote to the point where it reaches the amount the dealer truly desired. In this way, the dealer can avoid posting a large bid or offer in the first instance, which could potentially cause the market price to rise or fall significantly. The workup convention has also traditionally allowed participants to limit expected costs or losses with respect to stale quotes. One example of this practice working to the advantage of a dealer occurs when the market moves rapidly and the dealer is on the wrong side of the market price, i.e., the dealer has posted a low price for a security when the market price has increased for that security. By placing an order for an amount of the security lower than the amount actually desired, the dealer's loss on the transaction is limited because the dealer is not obligated to trade any additional quantity at a disadvantageous price.

Workup pre-existed the introduction of electronic trading systems and has long been part of standard trading in certain markets, such as the secondary market in U.S. Treasuries. But in most other markets, first-in-first-out ("FIFO") trading protocols are the standard model. FIFO protocols allow order queues to build based on the price and time that orders are placed, and all orders are matched on a first-come-first-served basis. A trader whose order initiates a trade is given no privileges. Some examples of markets that utilize a FIFO protocol include NASDAQ's electronic communication networks (ECNs), Island, Supermontage, Instinet, and Brut.

As the user community of electronic systems that trade U.S. government securities has increased to include traders used to trading in other markets, these new users have found it difficult to accept a workup protocol and prefer, in many cases, a FIFO protocol. At the same time, there are many users who are adherents to a workup protocol and reluctant to change to a FIFO protocol. Although it is possible to satisfy both groups of traders by providing separate FIFO and workup markets for the same security, this solution is not optimal because it splits the liquidity in the security into two distinct pools.

SUMMARY OF THE INVENTION

The present invention provides a multi-protocol trading system in which dealers preferring different trading protocols may coexist within the same system, and access the same liquidity pool, while maintaining their trading rule preferences. In a preferred embodiment, the system supports two trading protocol preferences.

In one preferred embodiment, the system comprises a single integrated order book that stores orders received from traders using two different trading protocols. Received orders are matched against orders in the order book as a function of the trading protocol preferences selected by the traders and/or the system operator.

In a second preferred embodiment, the system comprises a pair of order books, one for each trading protocol. Customers submit linked orders comprising two legs, one for each protocol, which may be matched against the protocols' respective order books, as a function of preferences selected by the traders and/or the system operator.

According to a first aspect of the present invention, there is provided an electronic trading system that allows for trading of a financial instrument in accordance with a plurality of trading protocols, the system comprising:

a matching engine;

a first trader interface in communication with the matching engine wherein the first trader trades from within a pool of the financial instrument utilizing a first trading protocol through the first trader interface; and a second trader interface in communication with the matching engine wherein the second trader trades from within a pool of the financial instrument utilizing a second trading protocol through the second trader interface.

Preferably, the trading protocols utilized by the traders are either the workup protocol or the FIFO protocol.

Advantageously, an order book is maintained for each of the plurality of trading protocols used in the system, the order books being physically or logically separated.

Preferably, the order books for each of the plurality of trading protocols are linked together and made available to users of any one trading protocol to form a pool of the financial instrument.

Advantageously, the system may include an integrated order book that is maintained for all of the plurality of trading protocols.

Preferably, a cancelled order in a first order book is automatically deleted from a second order book.

Advantageously, a filled order in a first order book is automatically deleted from a second order book.

Preferably, a partial fill of an order in a first order book triggers the automatic decrease of an order in a second order book.

Advantageously, the matching engine will first look within a first protocol order book to fill orders entered into the trading system by a trader utilizing a first protocol and the matching engine will look within a second protocol order book to fill orders not filled first within the first protocol order book.

Preferably, an integrated order book is maintained for the plurality of trading protocols.

Advantageously, a transactable received order triggers a workup transaction if both the received order and a matching resting order specify a workup preference, and triggers a FIFO transaction otherwise.

Preferably, a transactable received order triggers a FIFO transaction if both the received order and a matching resting order specify a FIFO preference, and triggers a workup transaction otherwise.

Advantageously, the matching engine is adapted to receive FIFO orders, workup orders and linked orders.

Preferably, FIFO orders are processed in accordance with a FIFO protocol and workup orders are processed in accordance with a workup protocol.

Advantageously, a first or second trader interface transmits a linked order comprising two legs indicating a protocol and the order of the legs in the linked order specifies a protocol preference for the linked order.

Preferably, the linked order is processed by determining first whether the linked order can be matched according to a FIFO protocol and, if any size of the linked order remains after exhausting FIFO-protocol matches, by determining whether the linked order can be matched according to a workup protocol.

Advantageously, the linked order is processed by determining first whether the linked order can be matched according to a workup protocol and, if any size of the linked order remains after exhausting workup-protocol matches, by determining whether the linked order can be matched according to a FIFO protocol.

Preferably, the linked order can be processed according to a protocol preference specified by a system operator.

Advantageously, when a workup is in progress, the linked order is processed by determining first whether the linked order can be matched according to a workup protocol and, if any size of the linked order remains after exhausting workup-protocol matches, by determining whether the linked order can be matched according to a FIFO protocol.

Preferably, when a workup is in progress, the linked order is processed by determining first whether the linked order can be matched according to a FIFP protocol and, if any size of the linked order remains after exhausting FIFO-protocol matches, by determining whether the linked order can be matched according to a workup protocol.

Advantageously, if a resting order specifies a workup protocol preference and a received order specifies a workup protocol preference, the resting and received orders are matched and a workup is commenced without a private phase.

According to a second aspect of the present invention, there is provided an interface to a central computer system for facilitating electronic trading of a financial instrument by a trader in accordance with a plurality of trading protocols, comprising:

a first display area for listing a first set of the financial instrument in accordance with said trader's preferred trading protocol, the first set of financial instrument being maintained with a first order book controlled by the central computer system; and a second display area for listing a second set of the financial instrument in accordance with the trader's alternative trading protocol, the second set of financial instrument being maintained with a second order book controlled by the central computer system;

the first order book and the second order book being physically or logically separated by the computer system and the first set of the financial instrument and the second set of the financial instrument comprising a pool of the financial instrument.

Preferably, a trader using any one of the plurality of trading protocols can use either the first display or the second display to trade any one of the financial instruments.

Advantageously, a trader may configure the first display area or the second display area to display information based on a workup protocol, a FIFO protocol, or both protocols.

Preferably, the first display area is configured according to a workup protocol and the first display area provides a signal to a trader when an order enters a private phase of the workup protocol.

Advantageously, the first display area is configured according to a workup protocol and provides a signal to a trader when an order is executed under a FIFO protocol that exceeds an original order size.

According to a third aspect of the present invention, there is provided a method for facilitating electronic trading of a financial instrument by a trader in accordance with a plurality of trading protocols, comprising:

receiving an order to buy or sell a quantity of said financial instruments via a first display area for listing a first set of the financial instrument in accordance with said trader's preferred trading protocol, the trading protocol being one of the workup protocol or a FIFO protocol, the first set of financial instrument being maintained with a first order book controlled by the central computer system; and receiving an order to buy or sell a quantity of the financial instruments via a second display area for listing a second set of said financial instrument in accordance with the trader's alternative trading protocol, the trading protocol being the other of the workup protocol or the FIFO protocol, the second set of financial instrument being maintained with a second order book controlled by the central computer system;

the first order book and the second order book being physically or logically separated by the computer system and the first set of the financial instrument and the second set of the financial instrument comprising a pool of said financial instrument.

Preferably, the trader using any one of the plurality of trading protocols can use either the first display or the second display to trade any one of the financial instrument.

Advantageously, the trader may configure the first display area or the second display area to display information based on a workup protocol, a FIFO protocol, or both protocols.

Preferably, the first display area is configured according to a workup protocol and the first display area provides a signal to the trader when an order enters a private phase of the workup protocol.

Advantageously, the first display area is configured according to a workup protocol and the first display area provides a signal to the trader when an order is executed under a FIFO protocol that exceeds an original order size.

DETAILED DESCRIPTION OF THE INVENTION

Figure 1:
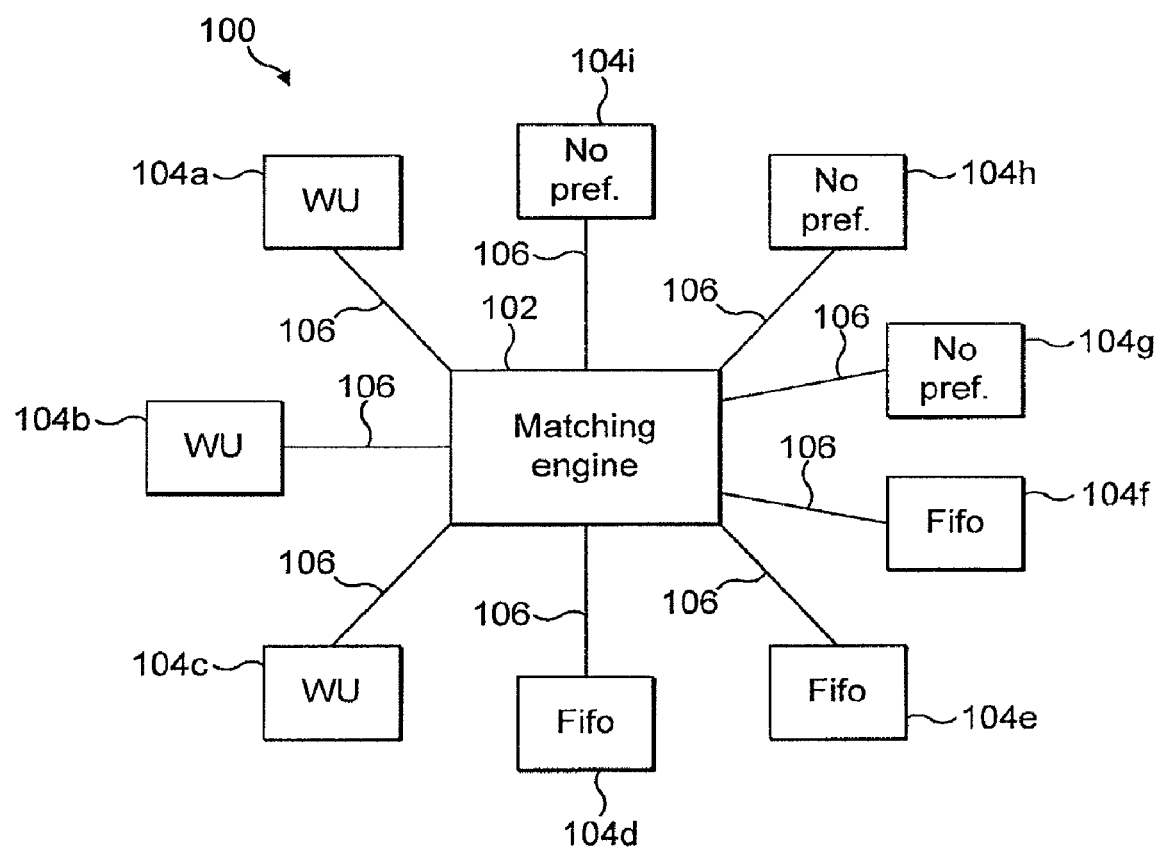
FIG. 1 is a block diagram depicting aspects of a preferred embodiment of the present system.

With reference to FIG. 1, there is shown a system 100 comprising a matching engine 102 and plurality of customer terminals 104 connected via appropriate communication links 106. Matching engine 102 is preferably adapted to receive orders to buy and sell securities from terminals 104, to execute transactions in accordance with specified protocols, and to communicate trade confirmation and market information concerning such transactions to terminals 104, as described in more detail below.

Matching engine 102 preferably comprises one or more server computers and associated components programmed to implement the trading activity and data structures described below. Each terminal 104 may preferably be a computer workstation comprising a CPU, memory, a display, and input devices, such as a mouse, keyboard, or specialized trading keypad. Terminals 104 may be provided to customers for direct entry of buy and sell orders on their own behalf, or to brokers for entry of such orders on behalf of others. Communication links 106 may comprise any appropriate arrangement of wired or wireless communication lines or networks, such as the Internet or dedicated communication lines.

In a preferred embodiment, the system allows a trader to designate himself or herself as having a preference for a particular trading protocol. Each trader may preferably designate himself or herself as a "workup trader" or a "FIFO trader," according to the trader's preference. This preference is preferably entered by the trader at a terminal 104 assigned to the trader. Terminal 104 preferably stores this preference information and applies it in generating buy and sell orders for transmission to matching engine 102, as described in more detail below. Alternatively, trading preferences may be set by an administrator at the exchange level, on a group-of-traders or firm-wide basis for all traders associated with a given firm. Additionally, a trading preference may be established only with respect to a particular financial instrument or only for a set period of time.

In the illustrative example of FIG. 1, the traders who trade via terminals 104a-c have designated themselves as "workup traders," the traders who trade via terminals 104d-f have designated themselves as "FIFO traders," and the traders who trade via terminals 104g-i have elected not to designate a preference as either workup or FIFO traders.

Figure 2:
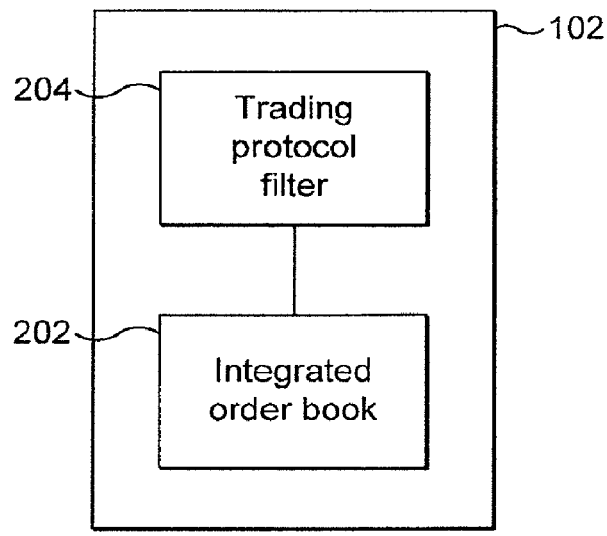
FIG. 2 is a block diagram depicting further aspects of the present system in one preferred embodiment.

Turning next to FIG. 2, one preferred embodiment of an architecture for organizing and maintaining buy and sell orders received at matching engine 102 will now be described. In the preferred embodiment of FIG. 2, matching engine 102 maintains a single integrated order book 202 that stores buy and sell orders received from terminals 104 and, for each order, whether a FIFO or workup preference has been designated for the order. Matching engine 102 further preferably comprises a trading protocol filter 204 that examines each incoming order and identifies an appropriate trading protocol (e.g., FIFO or workup) to be applied in processing the order, as described in more detail below.

Figure 3:
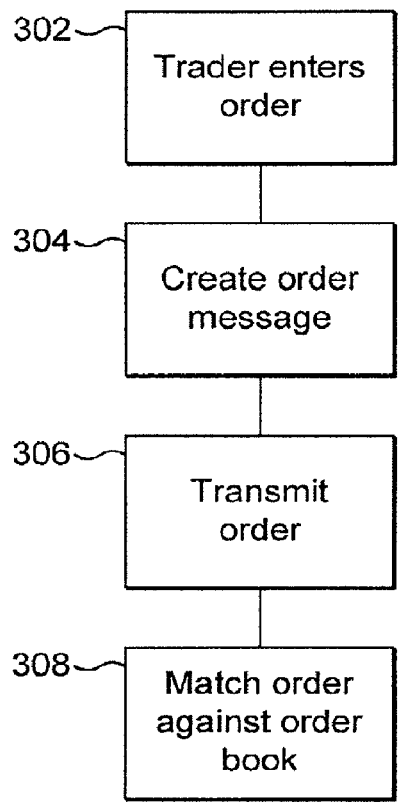
FIG. 3 is a flow diagram depicting aspects of order processing in a preferred embodiment of the present system.

One preferred embodiment for processing trader orders in accordance with the present invention is now described in connection with FIG. 3. As shown in FIG. 3, a trader enters an order to buy or sell a specified quantity of a specified security at a specified price (step 302). The order is preferably entered into terminal 104 via a suitable user interface. Terminal 104 creates an appropriate order message in a predetermined format for communication to matching engine 102 (step 304). The order message preferably comprises information specifying any necessary or desired order parameters including the trading command (e.g., bid, offer, hit, or lift), the order quantity, the order price, and any other user preferences such as preferences concerning the trading protocol to be applied to the order (e.g., workup, FIFO, or none), that the user may wish to specify. In a preferred embodiment, the preference specified for the order is selected as a function of whether the trader is designated a workup trader or a FIFO trader. The system may also be adapted to permit traders to specify a FIFO or workup preference on an order-by-order basis, particularly for those traders who have elected not to designate themselves as either FIFO or workup traders.

Terminal 104 preferably transmits the order message to matching engine 102 via a communication link 106 (step 306). The order is then preferably matched against order book 202 in accordance with a protocol selected by the system operator, as described in more detail below (step 308).

Figure 4:
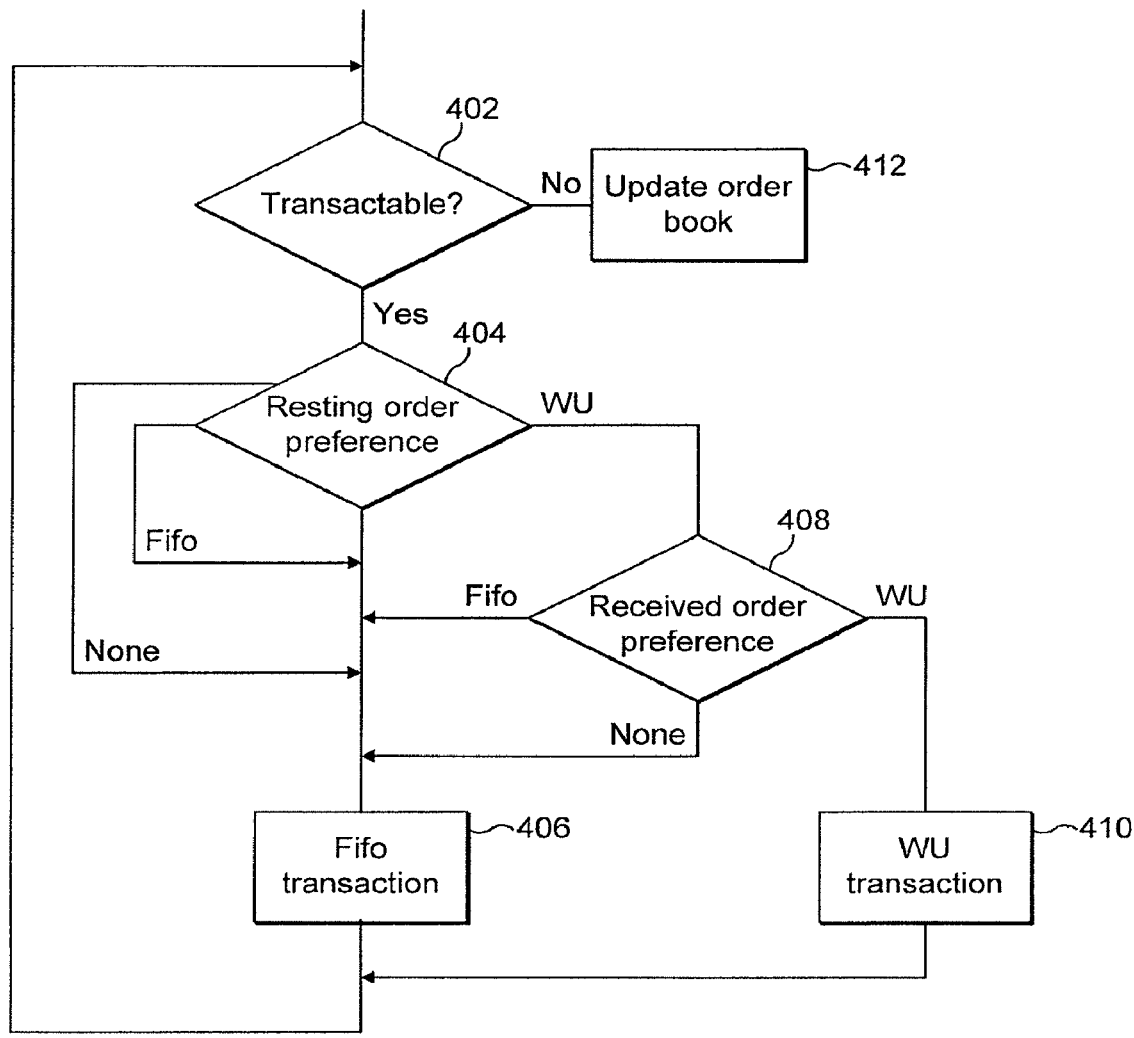
FIGS. 4-5 are flow diagrams depicting further aspects of order processing in two preferred embodiments of the present system.

One preferred embodiment for matching a received customer order against resting orders in order book 202 is described in connection with FIG. 4. In the embodiment of FIG. 4, the preferences expressed for both the received order and the resting order are considered in determining whether or not order processing should be conducted in accordance with a workup protocol or FIFO protocol.

In particular, as shown in FIG. 4, when a buy or sell order is received by matching engine 102, trading protocol filter 204 determines whether the order is one that can transact with any resting orders in integrated order book 202 (step 402). For example, in a preferred embodiment that distinguishes between passive and aggressive orders, an aggressive order (such as a FaK order) can be matched against available passive quantity on the opposite side of the market, but a passive order such as a bid cannot be matched against a passive resting offer in order book 202, even if the received bid and the resting offer are at the same price.

It should be noted, however, that the trading rules of certain markets, and particularly certain FIFO markets, do not distinguish between passive and aggressive orders, and allow all orders to be matched against same-priced orders on the opposite side of market. Moreover, in some markets, a trader may be permitted to electively cause his or her passive order to execute where the market is locked, i.e., when the best bid and best offer prices are the same. For ease of illustration, it will be assumed herein that both FIFO and workup trades must be commenced by an aggressive order such as a hit or lift. Those skilled in the art, however, will recognize that the principles of the present invention may be applied to any system that conducts concurrent trading according to any two or more trading protocols, whether or not some or all of those protocols distinguish between passive and aggressive orders.

If the received order can transact against an order in integrated order book 202 (referred to as a "resting order"), trading protocol filter 204 determines the preference specified for the resting order, if any (step 404). If the resting order to be matched has a FIFO preference or no preference, the transaction is conducted according to the FIFO protocol (step 406). Otherwise, if the preference specified for the resting order to be matched is for the workup protocol, trading protocol filter 204 determines the protocol preference of the received order, if any (step 408). If the preference of the received order is either FIFO or no preference, the transaction is conducted according to the FIFO protocol (step 406). If, however, the received order has a specified workup preference, then processing of the transaction is in accordance with the workup protocol (step 410). It will thus be recognized that the embodiment of FIG. 4 applies the workup protocol only if the received order and the resting order to be matched both specify a workup preference.

If after matching the received order against the highest-ranked resting order there remains some quantity of the received order that has not yet been matched, the next order in order book 202 that can be matched against this remaining quantity of the received order is preferably retrieved from the order book and the above process is repeated.

Any remaining portion of the received order that cannot be transacted against order book 202 is added to the order book, to the extent permitted by the system's protocols (step 412). Thus, for example, if the order is an aggressive FaS order that cannot be matched, a resting order for the un-transacted quantity is preferably added to order book 202. By contrast, if the received order is a FaK order, any remaining un-transacted quantity is "killed," and no resting order is added to order book 202.

Operation of the embodiment of FIG. 4 will now be illustrated by way of two trading examples:

Example 1

Trader A enters an order to buy 15 M of financial instrument X at a price of 100 with a workup trade preference. The order is received by matching engine 102 and trading protocol filter 204 searches order book 202 to determine if there is a matching resting order for Trader A's order. There is a first resting order from Trader E to sell 8 M of financial instrument X at 100 with a FIFO preference. The order book also contains a second resting order from Trader C to sell 8 M of financial instrument X at 100 with a workup preference. Matching engine 102 will match Trader A's buy order with the first resting order and the parties will execute a FIFO trade for 8 M of financial instrument X. The remaining 7 M will be matched with the second resting order and Traders A and C will commence a workup trade.

Example 2

Trader D enters an order to buy 20 M of financial instrument X at a price of 100 with a FIFO trade preference. The order is received by matching engine 102 and trading protocol filter 204 searches order book 202 to determine if there is a matching resting order for Trader D's order. There is a first resting order from Trader E to sell 15 M of financial instrument X at 100 with a FIFO preference. The order book also contains a second resting order from Trader C to sell 5 M of financial instrument X at 100 with a workup preference. Matching engine 102 will first match Trader D's buy order with Trader E's sell order and the parties will execute a FIFO trade. The remaining 5 M will be matched with Trader C as a FIFO trade.

Figure 5:
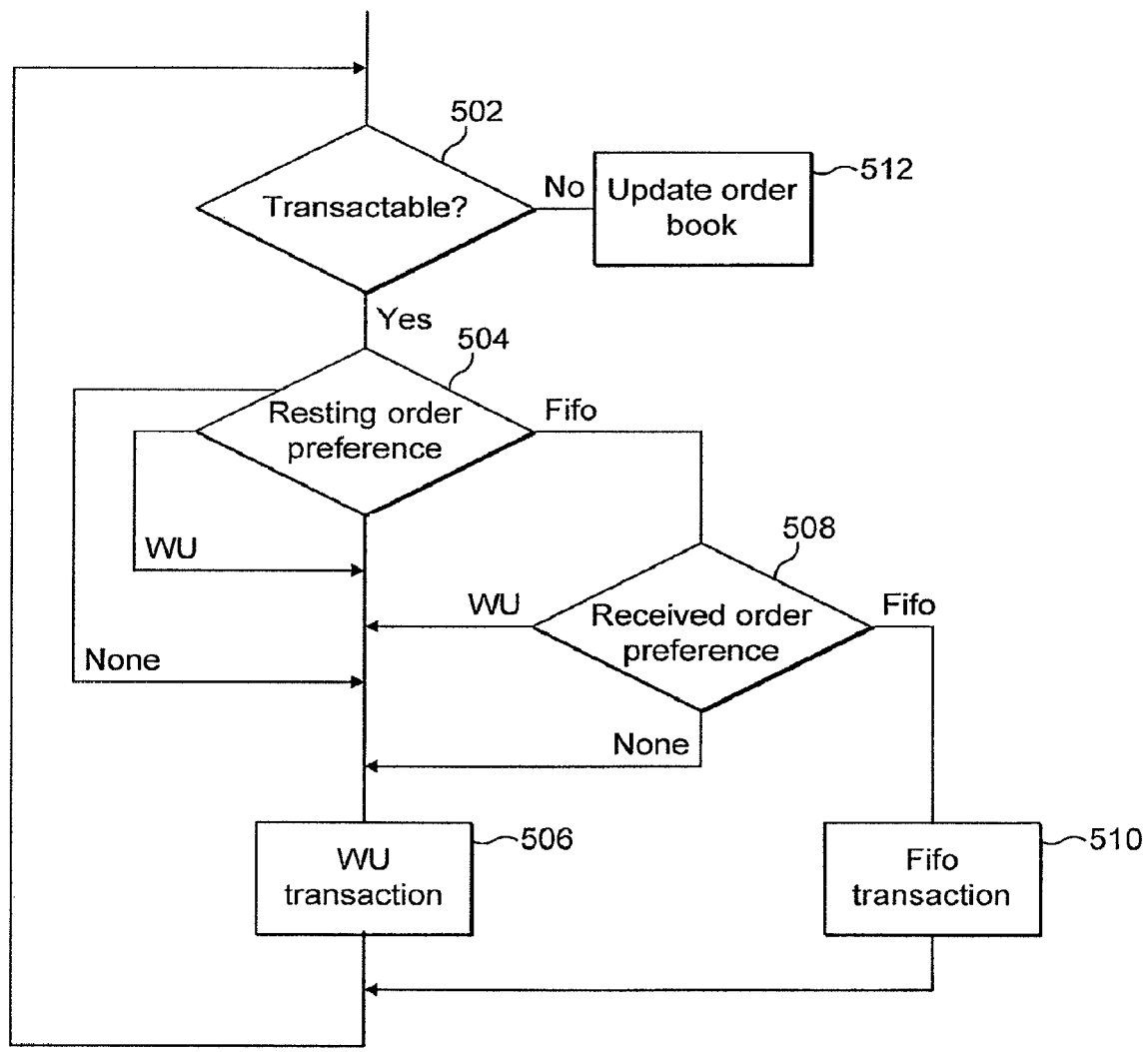

A second embodiment for processing orders in accordance with the present invention is shown in FIG. 5. As in the embodiment of FIG. 4, the preferences specified for both the resting order to be matched and the received order are considered in determining the trading protocol to be applied in this preferred embodiment. In particular, as shown in FIG. 5, when a buy or sell order is received by matching engine 102, trading protocol filter 204 determines whether the order is one that can transact with any resting orders in integrated order book 202 (step 502).

If the submitted order can transact against an order in the order book, the system determines the preference (e.g., a FIFO preference or a workup preference) specified for the resting order, if any (step 504). As noted, this preference may be set on a trader-by-trader basis (e.g., designating the trader as a FIFO trader such that all orders from that trader automatically specify a FIFO preference), or on an order-by-order basis.

If the resting order has a workup preference or no preference, the transaction is preferably conducted according to the workup protocol (step 506). Otherwise, if the resting order has a FIFO preference, trading protocol filter 204 determines the protocol preference of the received order, if any (step 508). If the preference of the received order is either workup or no preference, the transaction is preferably conducted according to the workup protocol (step 506). If, however, the received order also specifies a FIFO preference, then the transaction is conducted in accordance with the FIFO protocol (step 510). It will thus be recognized that the embodiment of FIG. 5 implements the FIFO protocol in executing a transaction only if the aggressor and the passive participant both specify a FIFO preference.

If after matching the received order against the retrieved order there remains some quantity of the received order that has not yet been matched, the next matchable order in order book 202 is retrieved and matched in accordance with the process described above. Any remaining portion of the received order that cannot be transacted against order book 202 is added to the order book, to the extent permitted by the system's protocols (step 512).

Figure 6:
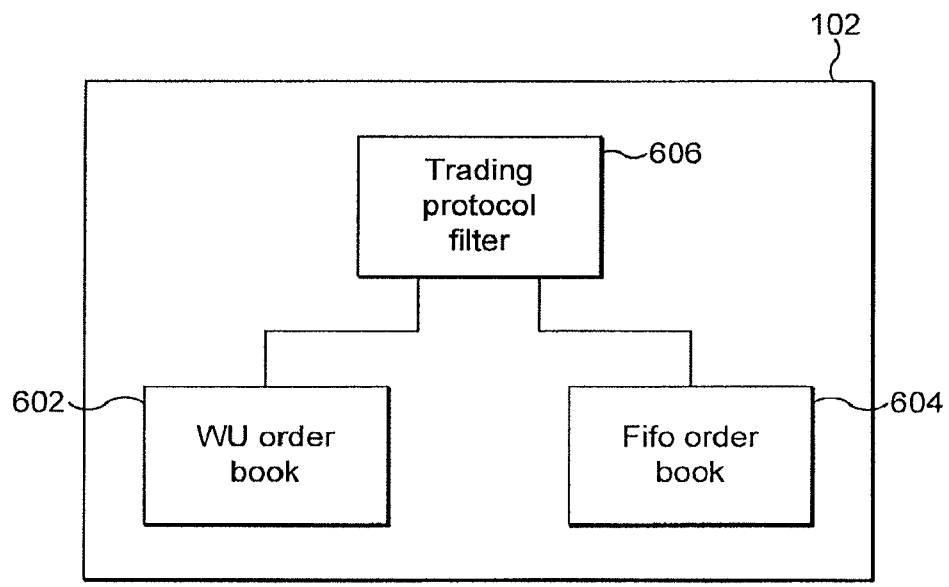
FIG. 6 is a block diagram depicting further aspects of the present system in one preferred embodiment.

A second preferred embodiment of an architecture for organizing and maintaining buy and sell orders received at matching engine 102 will now be described in connection with FIG. 6. As shown in FIG. 6, in this preferred embodiment, matching engine 102 maintains in memory two distinct order books, a first order book 602 in which are stored orders to be executed in accordance with a workup protocol, and a second order book 604 in which are stored orders to be executed in accordance with a FIFO protocol. Matching engine 102 further preferably comprises a trading protocol filter 606 that examines each incoming order and identifies an appropriate trading protocol (e.g., FIFO or workup) to be applied in processing the order, as described in more detail below.

In this preferred embodiment, terminals 104 are preferably adapted to create three distinct types of orders for transmittal to matching engine 102 in response to customer input. The three types of orders are referred to as workup orders, FIFO orders, and linked orders. A workup order is an order that the customer wishes to have matched only against orders in the workup book. Similarly, a FIFO order is an order that the customer wishes to have matched only against orders in the FIFO book.

Figure 7:
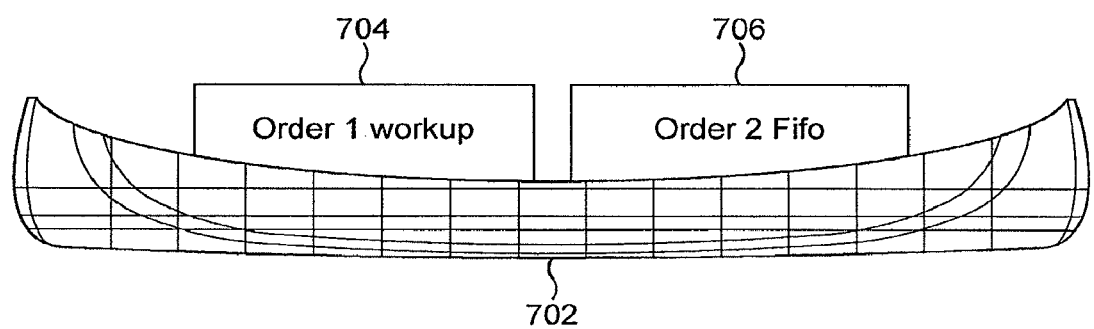
FIG. 7 is a diagram schematically depicting a structure for an order message in a preferred embodiment of the present system.

A linked order is preferably a composite order that specifies a desire to buy or sell securities in either the workup book or the FIFO book. As schematically shown in FIG. 7, in a preferred embodiment, the linked-order message 702 may be analogized to a "boat" having a "front seat" and a "back seat." The "front seat" corresponds to a slot 704 in message 702 that is populated by terminal 104 with information that identifies the first leg of the linked order, such as a workup order in the illustrative example of FIG. 7. The "back seat" of the boat corresponds to a slot 706 in message 702 that is populated with information that identifies the second leg of the linked order, such as a FIFO order in the illustrative example in FIG. 7. As explained in more detail below, in some preferred embodiments of the present invention, the system utilizes this message order to efficiently convey to matching engine 102 the customer preference concerning whether the linked order should be first matched against the FIFO book or the workup book. The system is preferably adapted so that the aggressor may designate himself as (1) a "workup trader," in which case terminal 104 will automatically structure all linked orders such that the workup leg of the order is in slot 704 to communicate a workup preference; or (2) as a FIFO trader, in which case terminal 104 will automatically structure all linked orders such that the FIFO leg of the order is in slot 704 to communicate a FIFO preference.

Figure 8:
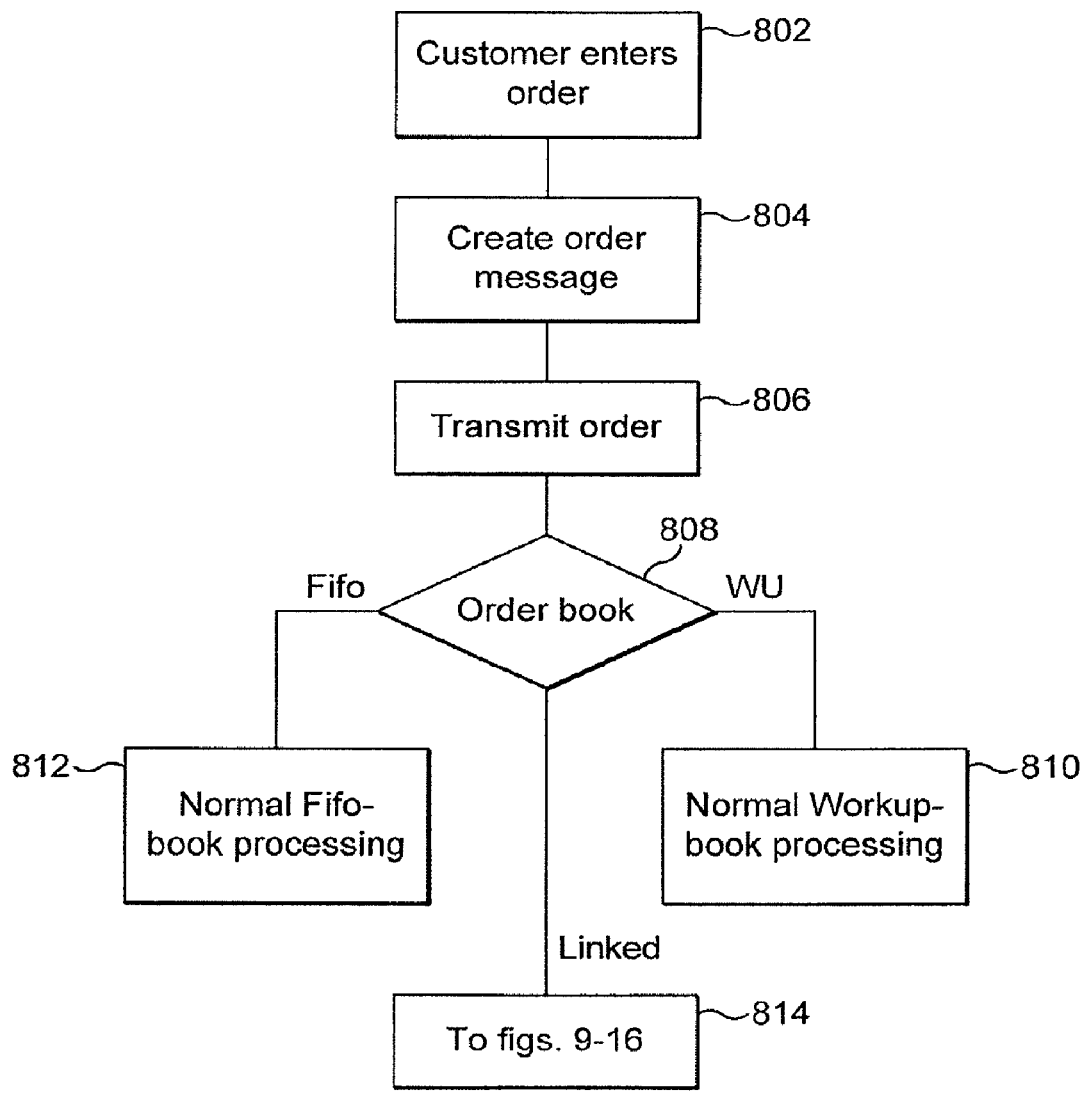
FIG. 8 is a flow diagram depicting aspects of order processing in one preferred embodiment of the present system.

Aspects of a preferred embodiment for generating and processing customer orders in accordance with this preferred embodiment are now described in connection with FIG. 8. As shown in FIG. 8, a customer enters an order to buy or sell a specified quantity of a specified security at a specified price into terminal 104 via a suitable user interface which will typically comprise the display of terminal 104 and one or more of the input devices described above (step 802). Terminal 104 creates an appropriate order message in a predetermined format for communication to matching engine 102 (step 804). The order message preferably comprises information specifying any necessary or desired order parameters including the type of order (e.g., workup, FIFO, or linked), the trading command (e.g., bid, offer, hit, or lift), the order quantity, the order price, and any other user preferences such as preferences concerning the trading protocol to be applied to the order, that the user may wish to specify.

Terminal 104 preferably transmits the order message to matching engine 102 via communication link 106 (step 806). Filter 606 of matching engine 102 examines the order to determine whether it is a workup order, a FIFO order, or a linked order (step 808). If the order is a workup order, the order is preferably matched against the workup order book in accordance with the normal workup protocol applied by the system to orders in that book (step 810). Similarly, if the order is a FIFO order, the order is preferably matched against the FIFO order book in accordance with the normal FIFO protocol applied by the system to orders in that book (step 812).

If, however, the order is a linked order, processing of the order is conducted in accordance with a third protocol (step 814). A number of preferred embodiments for processing linked orders will be described below in connection with FIGS. 9-16. Notably, processing of linked orders is preferably conducted in a manner such that the trader's maximum exposure in terms of quantity of the specified security that may be traded is that quantity set in the linked order. In particular, the matching engine 102 is adapted to monitor at all times whether any quantity of any leg (e.g., the workup leg or the FIFO leg) of a linked order has been executed and to decrement the corresponding leg of the linked order (e.g., the FIFO leg or the workup leg) by the same quantity to ensure that the trader never buys or sells more than the total quantity specified in the linked order.

Figure 9:
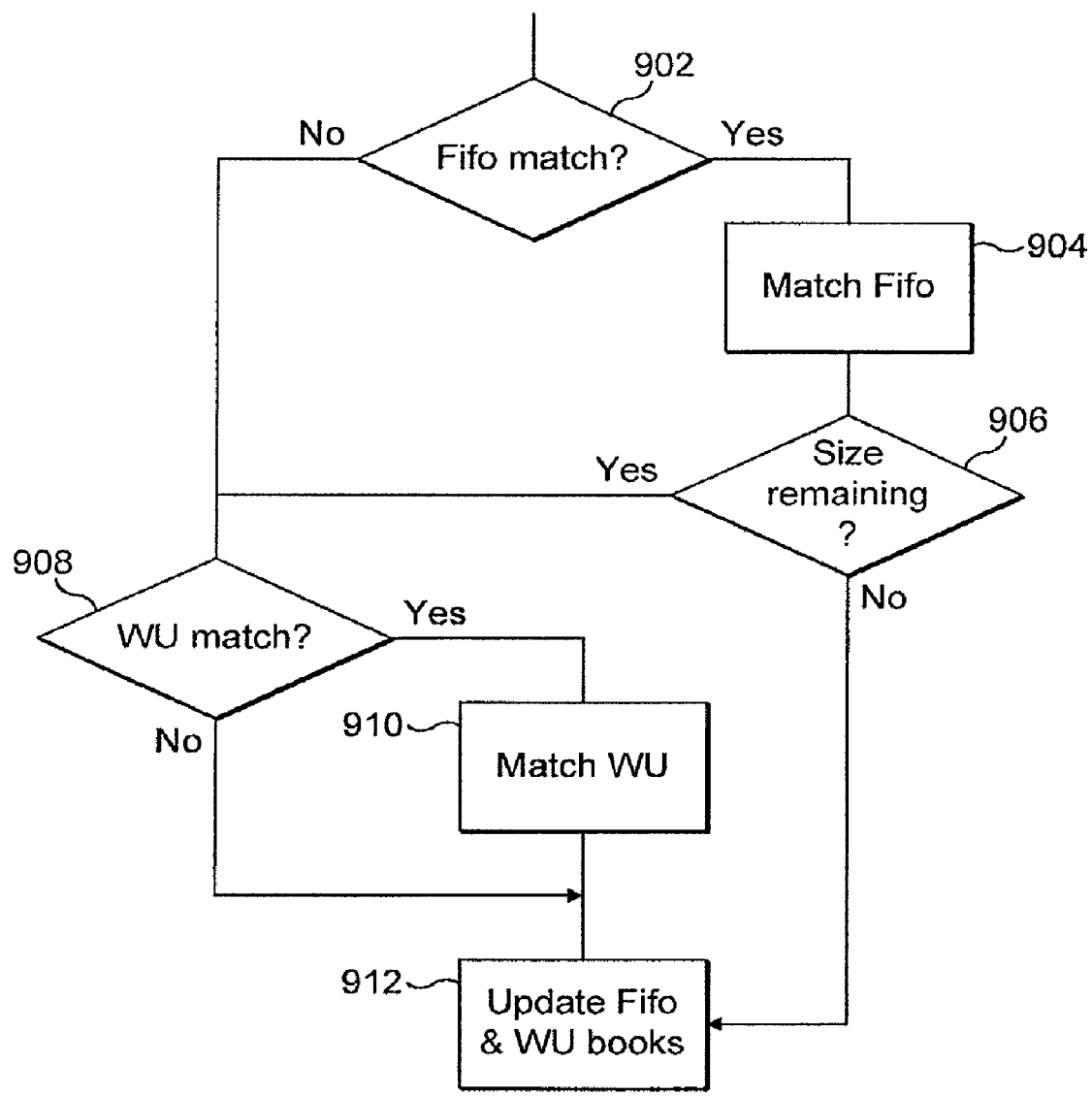
FIGS. 9-16 are flow diagrams depicting further aspects of order processing in seven preferred embodiments of the present system.

Turning now to FIG. 9, there is shown a first embodiment for processing linked orders that will have the effect of promoting trading in the FIFO order book at the expense of the workup order book. In the embodiment of FIG. 9, the system determines whether or not the FIFO order of the linked order pair is able to be matched with orders in the resting FIFO order book (step 902). Thus, for example, if the order is an aggressive FaS order to sell (commonly referred to as a "hit") and there exists available passive volume in the FIFO order book, the command will result in a transaction executed in the FIFO book. On the other hand, if, for example, the order is a bid, and the system is one that will not automatically match same-priced passive orders, and requires a hit or lift to trigger a trade in either the workup or FIFO order books, then this order will not result in any FIFO execution.

If the submitted order can be matched against the FIFO book, the order is matched to the extent possible under the system's FIFO trading rules (step 904) and the system determines whether or not any size of the FIFO leg of the linked order remains or if the FIFO leg has been completely matched (step 906). If there is no size remaining from the original linked order, no attempt is made to match the workup leg of the linked order against the workup order book. Specifically, because the two legs of the order are linked, the customer is guaranteed that the total amount of size that will be traded in the amount specified in either of the linked orders, the FIFO order or the workup order that make up the linked order. Because all of the size in the FIFO order has been matched, the quantity of the linked workup order is reduced to zero and is not entered in the resting workup order book. Similarly, if the resting order against which the submitted order was matched is a linked order with a corresponding leg in the workup order book, the system will decrement the size of the corresponding workup leg to ensure that the total quantity transacted by the trader who submitted the resting order does not exceed the linked-order size.

By contrast if the received order is not able to create a match in the FIFO order book (step 902) or if after being matched to the extent possible against the FIFO order book there is still size remaining in the received order (step 906), the system proceeds to determine whether or not a match is possible in the workup order book under the system's workup trading rules (step 908). If a match is possible, the workup leg of the linked order pair is matched against the workup order book. For example, if the linked order is an aggressive order and no workup is currently ongoing in the workup book, or a workup is ongoing but the trader that submitted the linked order is one with privileges to transact currently during the workup, then the linked order will be executed to the extent possible (step 910).

The system updates both the FIFO and workup order books to reflect any remaining size of the submitted linked order or other changes to the order books (step 912). More specifically, if any quantity of the linked order remains, a corresponding pair of orders is preferably added to the FIFO and workup books, respectively, in that amount. In a preferred embodiment, the orders are preferably assigned a common order number by the system for identification. However, each order is also preferably assigned its own unique identification number and shown to the market as two separate orders in respective FIFO and workup line items displayed to traders via terminals 104.

Operation of the embodiment of FIG. 9 will now be illustrated by way of two trading examples:

Example 1

Trader A enters a linked order to buy 10 M of financial instrument X at a price of 100. The order filter 606 of the matching engine first looks to match Trader D's order in the FIFO order book. The FIFO order book contains a resting order of Trader D with an offer to sell 5 M of financial instrument X at 100. The order filter 606 matches Trader A with Trader D for 5 M of his order. The order filter 606 then looks to the workup order book to mach the remaining 5 M needed by Trader A. Assume that no workup is ongoing and that the workup order book contains a resting order of Trader B for 5 M of financial instrument X at 100. Trader A and Trader B are matched and the parties enter into a workup trade whereby Trader A is able to purchase its remaining 5 M from Trader B as well as additional quantities.

Example 2

Trader D enters a linked order to buy 10 M of financial instrument X at a price of 100. The order filter 606 of the matching engine first looks to match Trader D's order in the FIFO order book. The FIFO order book does not contain a match for Trader D's order. Filter 606 next looks to the workup order book to fill the order. The workup order book contains a resting order of Trader B for 10 M of financial instrument X at 100. Trader D's order is matched in its entirety by Trader B and no workup ensues.

Figure 10:
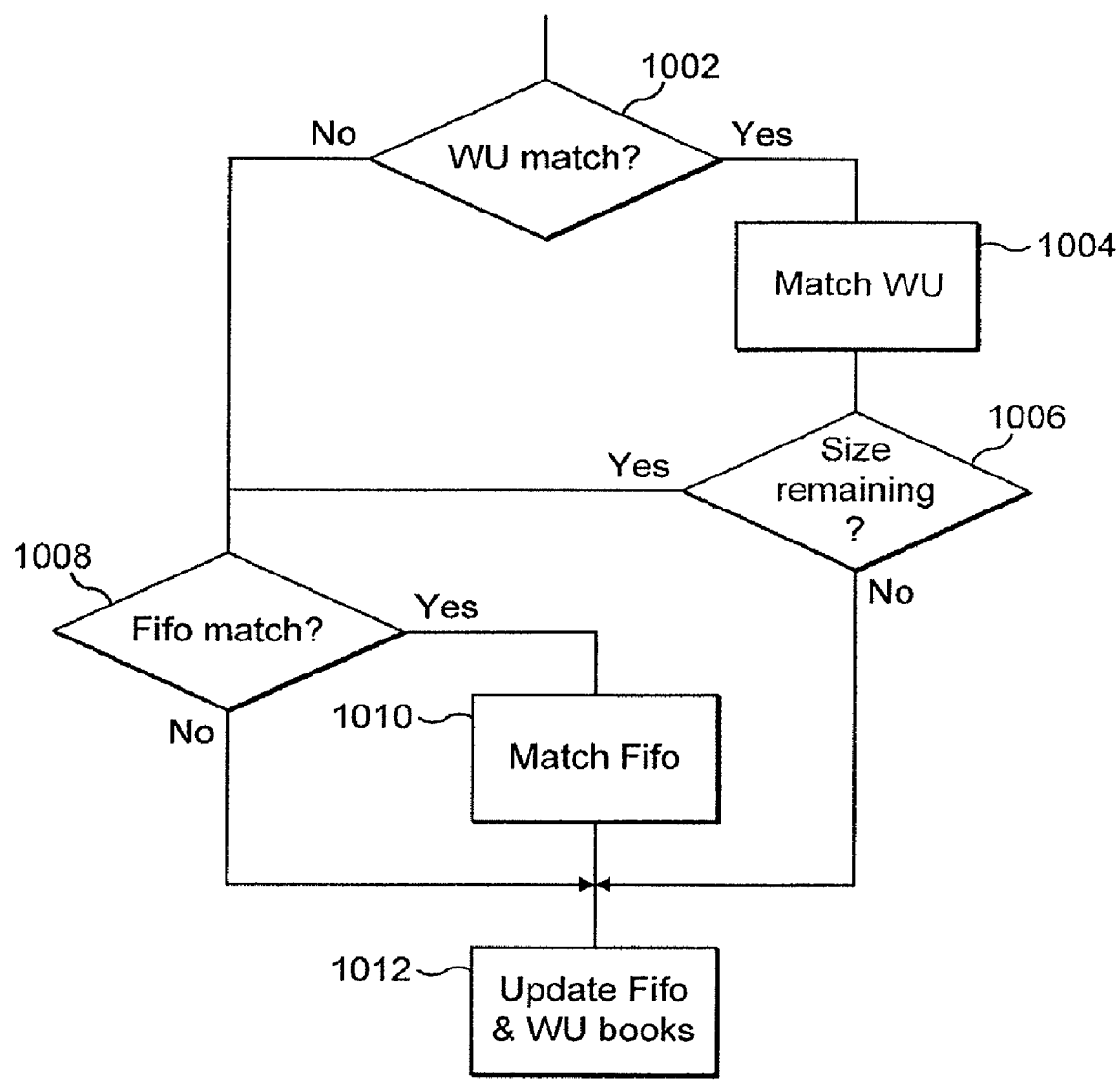

A second preferred embodiment for processing linked orders in the present invention is shown in FIG. 10. This preferred embodiment is adapted to promote trading in the workup order book at the expense of the FIFO order book. In the embodiment of FIG. 10, the system determines whether or not the workup order of the linked order pair is able to be matched with orders in the resting workup order book (step 1002). Thus, for example, if the order is a hit and there exists available passive volume in the workup order book, the command will result in a transaction executed in the workup order book. On the other hand, if, for example, the trader order is a bid, and the system is one which requires a hit or lift to trigger a trade and will not automatically match same-priced passive orders, then this order will not result in a transaction.

If the submitted order can be matched against the workup order book, the order is matched to the extent possible under the system's workup trading rules (step 1004) and the system determines whether or not any size of the linked order remains or if it has been completely matched (step 1006). If there is no size remaining from the original linked order, processing of the linked order concludes, as noted above.

By contrast if the received order does not trigger a match in the workup order book (step 1002) or if after being matched to the extent possible against the workup order book there is still size remaining in the received order (step 1006), the system determines whether or not a match is possible in the FIFO order book under the system's FIFO trading rules (step 1008). If a match is possible, the FIFO leg of the linked order pair is matched against the FIFO order book. For example, if the linked order is an aggressive order and there is available passive volume to match in the FIFO order book, then the linked order will be executed to the extent possible (step 1010).

The system updates both the workup and FIFO order books to reflect any remaining size of the submitted linked order (step 1012). More specifically, if any quantity of the linked order remains, a corresponding pair of orders is preferably added to the workup and FIFO order books, respectively, in that amount. As above, the orders are preferably assigned a common order number by the system for identification, but each order is also preferably assigned its own unique identification number and shown to the market as two separate orders in respective workup and FIFO line items displayed to traders via terminals 104.

Operation of the embodiment of FIG. 10 will now be illustrated by way of two trading examples:

Example 1

Trader A enters a linked order to buy 10 M of financial instrument X at a price of 100. Filter 606 of matching engine 102 first looks to match Trader D's order in the workup order book. The workup order book contains a resting order of Trader B with an offer to sell 5 M of financial instrument X at 100. Filter 606 matches Trader D's order with Trader B's order. The parties enter into a workup trade wherein Trader A purchases the full 10 M of financial instrument X he requires from Trader B.

Example 2

Trader D enters a linked order to buy 10 M of financial instrument X at a price of 100. Filter 606 of matching engine 102 first looks to match Trader D's order in the workup order book. The workup order book contains a resting order of Trader A for 10 M of financial instrument X at 100. Trader D's order is matched in its entirety by Trader A, and no workup ensues.

Figure 11:
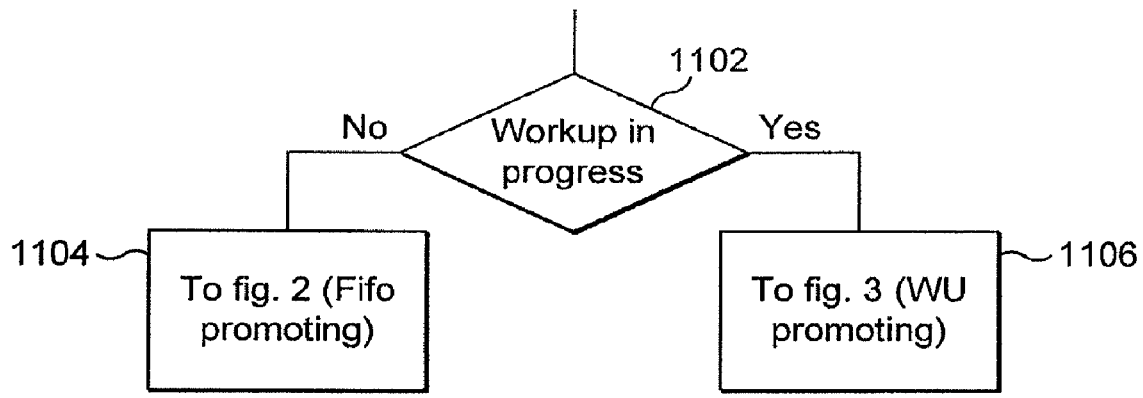

A third preferred embodiment for processing linked orders in accordance with the present invention is shown in FIG. 11. This preferred embodiment is designed to promote trading in the workup order book while a workup is in progress, but otherwise to promote trading in the FIFO order book. In the embodiment of FIG. 11, the system determines whether or not a workup is in progress in the workup order book (step 1102). If a workup is not in progress, the linked order is processed as shown in FIG. 9 above, i.e., in accordance with the FIFO promoting embodiment (step 1104). Otherwise, the order will be processed in accordance with the logic shown in FIG. 10 above, i.e., the workup promoting embodiment (step 1106). As will be recognized, in systems where certain traders are granted exclusive trading privileges during a workup, this embodiment has the effect of enhancing the value of such privileges since, while a workup is in progress, the system will attempt to match incoming orders first in the workup order book where a counterparty with exclusive trading privileges will be able to satisfy at least some of its pending size.

Operation of the embodiment of FIG. 11 will now be illustrated by way of two trading examples:

Example 1

Trader A enters a linked order to buy 10 M of financial instrument X at a price of 100. The order filter 606 of matching engine 102 first determines that a workup private phase is in process. Filter 606 then looks to match Trader D's order in the workup order book. The workup order book contains a resting order of Trader B with an offer to sell 5 M of financial instrument X at 100. Trader A and Trader B are workup owners and their orders are thus transactable. The order filter 606 matches Trader A with Trader B. The parties enter into a workup trade wherein Trader A purchases the 10M of financial instrument X from Trader B.

Example 2

Trader A enters a linked order to buy 10 M of financial instrument X at a price of 100. Filter 606 of matching engine 102 first determines that a workup order is not in process. Filter 606 then looks to match Trader D's order in the FIFO order book. The FIFO order book contains a resting order of Trader E for 10 M of financial instrument X at 100. Trader D's order is matched in its entirety by Trader E and no workup ensues.

Figure 12:
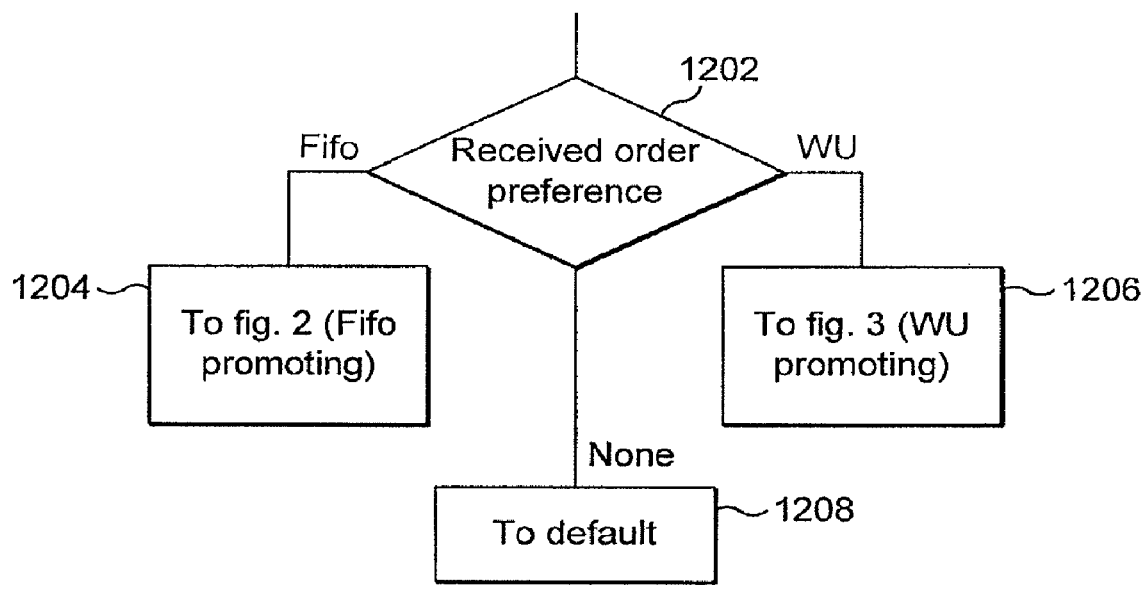

A fourth embodiment for processing linked orders in accordance with the present invention is shown in FIG. 12. In the embodiment of FIG. 12, an aggressor's preference for workup versus FIFO trading is taken into account in determining whether or not to select workup promoting or FIFO promoting processing for linked orders. As shown in FIG. 12, filter 606 examines each incoming linked order to determine whether the order designates a workup preference or a FIFO preference (step 1202). In a preferred embodiment, this preference may be communicated using the technique described above in connection with FIG. 7.

If the order specifies a FIFO preference, processing is conducted in accordance with the FIFO promoting embodiment of FIG. 9 (step 1204). If the order specifies a workup preference, processing is conducted in accordance with the workup promoting embodiment of FIG. 10 (step 1206). Finally, if the received order does not specify a preference, the system preferably defaults to any desired protocol selected by the system operator (step 1208).

Operation of the embodiment of FIG. 12 will now be illustrated by way of two trading examples:

Example 1

Trader A enters a linked order to buy 10 M of financial instrument X at a price of 100 with a workup trade preference. Filter 606 of matching engine 102 first looks to match Trader D's order in the workup order book in accordance with Trader D's preference. The workup order book contains a resting order of Trader B with an offer to sell 5 M of financial instrument X at 100. Filter 606 matches Trader A with Trader B and the parties then enter a workup. Trader A has a remaining need for 5 M of financial instrument X. There are no matches in the workup order book for the remaining 5 M, thus filter 606 looks to the FIFO order book to mach the remaining 5 M of Trader A. The FIFO order book contains a resting order of Trader D for 5 M of financial instrument X at 100. Trader A and Trader D are matched for the remaining 5 M needed by Trader A.

Example 2

Trader D enters a linked order to buy 10 M of financial instrument X at a price of 100 with a FIFO trade preference. Filter 606 first looks to match Trader D's order in the FIFO order book. The FIFO order book does not contain a match for Trader D's order. Filter 606 next looks to the workup order book to fill the order. The workup order book contains a resting order of Trader B for 10 M of financial instrument X at 100. Trader D's order is matched in its entirety by Trader B and a workup ensues.

Figure 13:
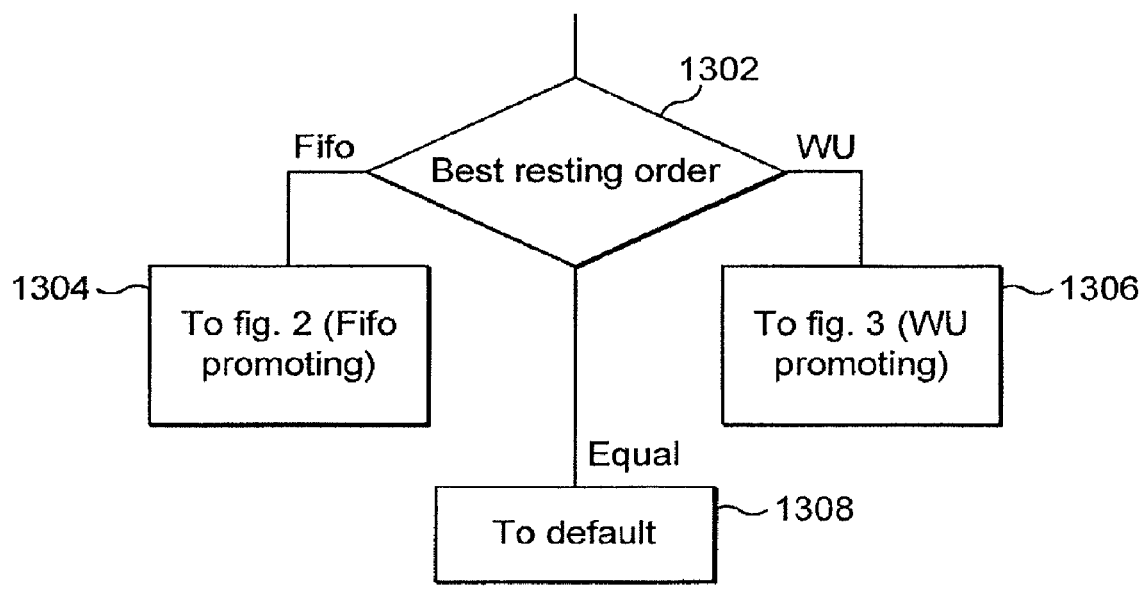

A fifth embodiment for processing linked orders in accordance with the present invention is shown FIG. 13. In the embodiment of FIG. 13, the system determines whether the highest ranked order able to be matched with the incoming linked order is found in the FIFO order book or in the workup order book (1302). Highest ranked bid/offer is preferably determined on a price and then time basis. Where the highest ranked passive order is in the FIFO book, the system processes the received order in accordance with the processing of FIG. 9, FIFO promoting (1304). By contrast, where the highest ranked order is in the workup order book, the system processes the received order in accordance with the logic of FIG. 10, workup promoting (1306). Finally, if the best order in the FIFO and workup order books are the same in both time and price priority, i.e., if they represent a linked order submitted by a single trader, then the system preferably defaults to any desired protocol selected by the system operator (1308). In a preferred embodiment this default protocol may take account of a stored FIFO/workup preference for the resting linked order. More specifically, where the trader who submitted the resting linked order specified a FIFO preference for the order, processing may default to the logic of FIG. 9, FIFO promoting. Conversely, where the trader who submitted the resting linked order specified a workup preference, processing may default to the logic of FIG. 10, workup promoting.

Operation of the embodiment of FIG. 13 will now be illustrated by way of two trading examples:

Example 1

Trader A enters a linked order to buy 10 M of financial instrument X at a price of 100. The system looks to both the FIFO order book and the workup order book to determine which order book holds the highest ranked order based on price and time. The FIFO order book holds the highest ranked order, thus the system first looks to match Trader D's order in the FIFO order book. The FIFO order book contains a resting order for Trader D for 20 M of financial instrument X at 100. The system matches Trader D's order with Trader D's order to execute a FIFO trade for 10 M of financial instrument X, leaving Trader D with a remainder of 10 M.

Example 2

Trader A enters a linked order to buy 10 M of financial instrument X at a price of 100 with a workup trade preference. The system looks to both the FIFO order book and the workup order book to determine which order book holds the highest ranked order based on price and time. The workup order book holds the highest ranked order, thus the system first looks to match Trader D's order in the workup order book. The workup order book contains a resting order of Trader B for 10 M of financial instrument X at 100. Trader D's order is matched with Trader B and a workup trade ensues.

Figure 14:
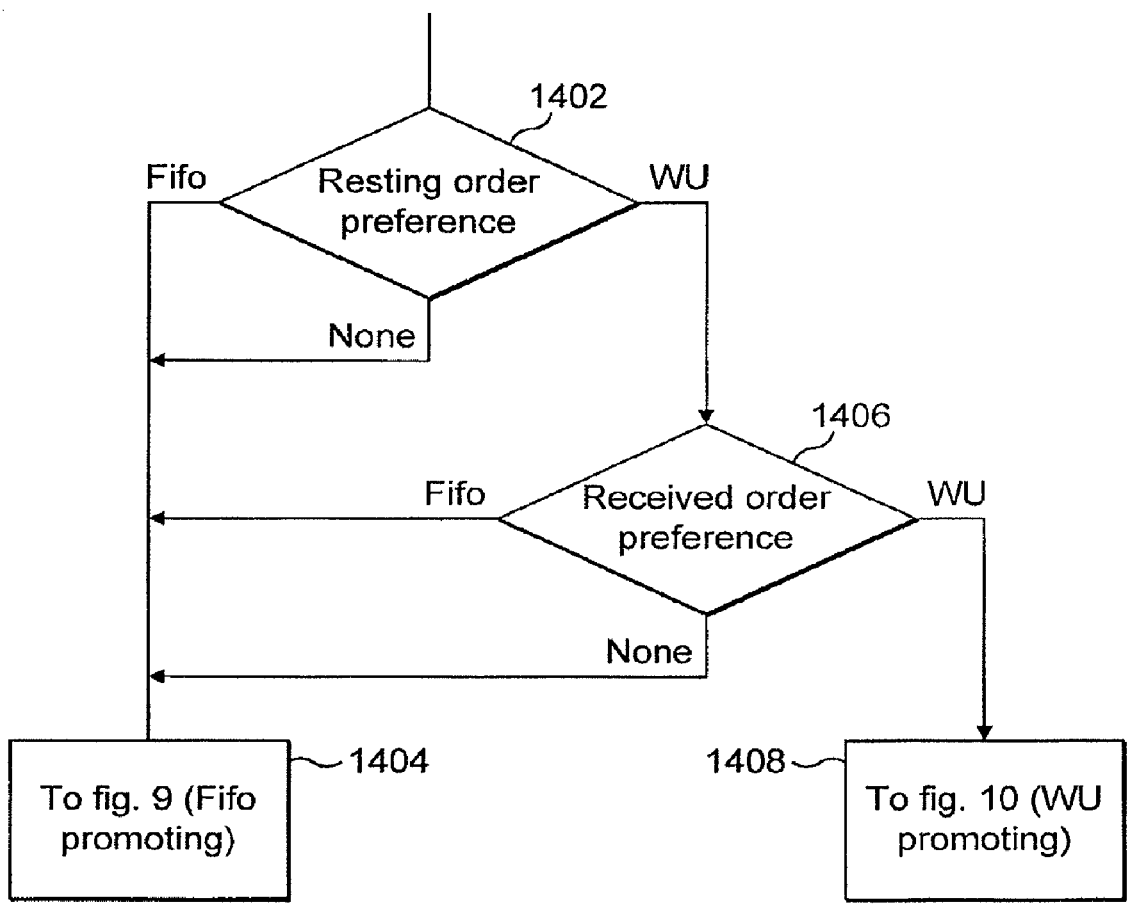

A sixth embodiment for processing linked orders in accordance with the present invention is shown in FIG. 14. In the embodiment of FIG. 14, the preferences of both the passive participant and the aggressor participant are considered in determining whether or not order processing should adopt a workup promoting or FIFO promoting protocol. In particular as shown in FIG. 14, the system first determines whether the passive order to be matched has a preference that is FIFO or none (step 1402). If so, processing is conducted in accordance with FIG. 9, FIFO promoting (step 1404). Otherwise, if the resting order preference is workup, the system determines the preference associated with the received order, if any (step 1406). If the preference is either FIFO or no preference, processing proceeds to the FIFO promoting embodiment of FIG. 9. Otherwise, if the received order has a workup preference, then processing proceeds to the workup promoting embodiment of FIG. 10 (step 1408). Thus, it will be recognized, the embodiment of FIG. 14, implements the workup promoting embodiment of FIG. 10 only if the received order and the resting order to be matched both specify a workup preference.

Operation of the embodiment of FIG. 14 will now be illustrated by way of two trading examples:

Example 1

Trader A, a trader with a workup preference, enters a passive order for 10 M of financial instrument X at a price of 100. The system receives an order from Trader D, a trader with a FIFO preference, that matches Trader D's order. The system matches Trader D's order with Trader D's order for a FIFO trade.

Example 2

Trader A, a trader with a workup preference, enters a passive order for 10 M of financial instrument X at a price of 100. The system receives an order from Trader B, a trader with a workup preference, that matches Trader D's order. Trader D's order is matched with Trader B and a workup trade ensues.

Figure 15:
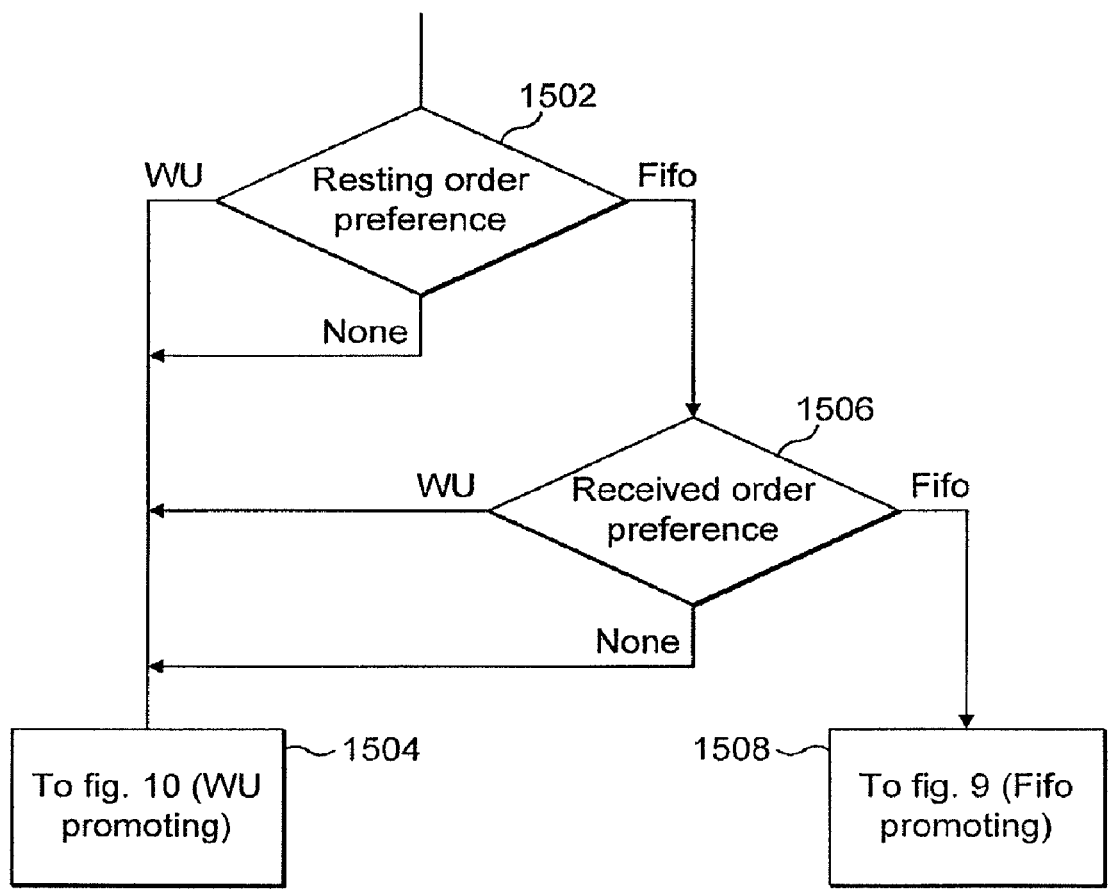

A seventh embodiment for processing linked orders in accordance with the present invention is shown in FIG. 15. As in the embodiment of FIG. 14, the preferences of both the passive participant and the aggressor participant are considered in this embodiment. In particular, as shown in FIG. 15, the system first determines whether the resting order has a preference that is workup or none (step 1502). If so, processing is conducted in accordance with the workup promoting embodiment of FIG. 10 (step 1504). Otherwise, if the resting order preference is FIFO, the system determines the received order's preference, if any (step 1506). If the preference is either workup or no preference, processing proceeds to the workup promoting embodiment of FIG. 10. Otherwise, if the received order's preference is FIFO, processing proceeds to the FIFO promoting embodiment of FIG. 9. Thus, it will be recognized, the embodiment of FIG. 15 implements the FIFO promoting embodiment of FIG. 9 only if the aggressor and the passive participant both specify a FIFO preference.

Operation of the embodiment of FIG. 15 will now be illustrated by way of two trading examples:

Example 1

Trader D, a trader with a FIFO preference, enters a passive order for 10 M of financial instrument X at a price of 100. The system receives an order from Trader A, a trader with a workup preference, that matches Trader D's order. The system matches Trader D's order with Trader D's order for a workup trade.

Example 2

Trader D, a trader with a FIFO preference, enters a passive order for 10 M of financial instrument X at a price of 100. The system receives an order from Trader E, a trader with a FIFO preference, that matches Trader D's order. Trader D's order is matched with Trader E as a FIFO trade.

Figure 16:
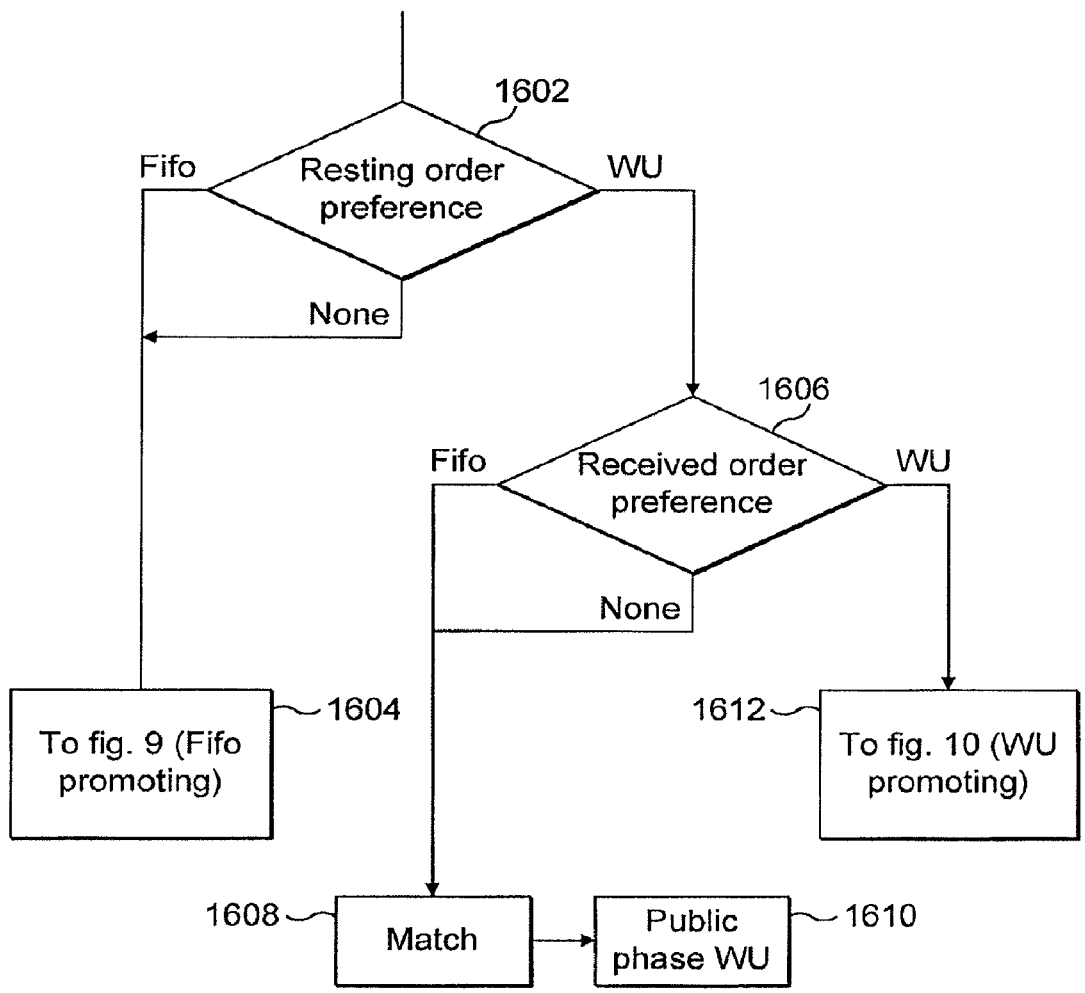

An eighth embodiment for processing linked orders in accordance with the present invention is show in FIG. 16. In particular, as shown in FIG. 16, the system first determines whether the resting order to be matched has a preference that is FIFO or none (step 1602). If so, processing is conducted in accordance with FIG. 9, FIFO promoting (step 1604). Otherwise, if the resting order preference is workup, the system determines the preference associated with the received order, if any (step 1606). If the preference is either FIFO or no preference, the orders are matched and a workup is triggered with no private phase. Instead, a workup is preferably commenced that begins with a public phase during which the transaction price at which executions occur is fixed but no traders are granted exclusive trading privileges (step 1610). Otherwise, if the received order has a workup preference, then processing proceeds to the workup promoting embodiment of FIG. 10 (step 1612).

Operation of the embodiment of FIG. 16 will now be illustrated by way of two trading examples:

Example 1

Trader D enters an order to buy 10 M of financial instrument X at a price of 100 with a FIFO preference. Filter 606 looks to match Trader D's order in the FIFO order book, however, the FIFO order book does not contain a match. The workup order book contains a resting order of Trader A with an offer to sell 15M of financial instrument X at 100. The filter 606 matches Trader D with Trader A. Trader A has a remainder of 5 M and a workup public phase is commenced.

Example 2

Trader A enters an order to buy 10 M of financial instrument X at a price of 100 with a workup preference. Filter 606 looks to match Trader D's order in the workup order book. The workup order book contains a resting order of Trader B for 10 M of financial instrument X at a price of 100. Filter 606 matches Trader D's order with Trader B and a workup trade ensues.

As will be recognized, implementation of the present invention may at times lead to instances where order books 602, 604 have the same prices, but with different orders in the queue. An example is as follows: In both the Workup and FIFO order books Trader A and Trader B enter linked bids for 10 million shares of financial instrument X at a price of 100, trader A having time priority. Assume Trader C hits Trader D's bid for 10 million shares and this transaction is conducted in accordance with a workup protocol. Trader A then buys 10 million shares from Trader C. During the private phase of the workup, Trader A increases size and adds another 10 million shares (Trader B has yet to buy). At this point, if no additional matches happen during the private phase of the workup, the order books would preferably be updated as follows: the workup order book would remain the same with the Trader A and B having the same bid and with Trader A having time priority because Trader A, as the first bidder, retains priority during the private phase of the workup. In the FIFO order book, however, while the bid's size and price remain the same, Trader B would now be placed at the top of the queue as the order of the queue in FIFO is based on pure price time priority. Despite these differences, traders will be operating in a fair and efficient market with quicker execution. The benefits of both protocols will help draw a larger liquidity base for the trading platform.

In a preferred embodiment, traders are given the option via a user interface to configure their individual pages at their terminals 104 to display the traditional workup order book, the FIFO order book, or both. The trader is also preferably able to establish preference settings to designate when orders should be submitted as workup-only, FIFO-only, or linked orders.

More specifically, in a preferred embodiment, terminals 104 are programmed to permit the trader to set his or her terminal to display, in a first display area, order and transaction data concerning any selected group of financial instruments transacted via matching engine 102 in accordance with a trader's preferred trading protocol (e.g., FIFO or workup), and to display, in a second display area, order and transaction data concerning the same or other financial instruments transacted via matching engine 102 in accordance with an alternative trading protocol selected by the trader. Alternatively, the trader may select to display any one such area without the other. The system is also preferably adapted to provide traders with an option to configure order and transaction data for two trading protocol preferences within a single display area. For example, the display area may be organized such that order and transaction data associated with FIFO are located in one section of the display area, while order and transaction data associated with workup are located in a separate section of the display area. Alternatively, the transaction data may appear in the same section of the display area with appropriate designations associated with the order and transaction data (e.g., a W designation before workup orders or an F designation before FIFO order) to differentiate between the different types of orders and transactions. Terminals 104 are further preferably adapted to permit traders to automatically enter orders with a workup preference via an interface associated with a workup display area, and to automatically enter orders with a FIFO preference via an interface associated with a FIFO display area.

Where a display area is configured to display workup orders and transactions, the display area preferably provides a signal to the trader when an order causes the system to enter a private workup phase. In addition, the display area in such a case also preferably provides a signal to the trader when an order is executed under a FIFO protocol that exceeds an original order size.

In a preferred embodiment, the system is programmed to permit traders to enter a linked order transaction as a quotation-type transaction. Traders are thus able to re-quote a linked order and the system will replace the previous order that was quoted so long as that order number is specified by the trader. The trader is preferably able to enter the following information for an order: the validity time, client, customer information in a free text field, exchange info and bid or ask information. The system is also preferably adapted to receive user queries via the user interface to identify a customer's linked orders, and whether such orders are active or inactive. Deletion of one leg of a linked order by a trader, preferably deletes both legs concurrently. A proxy function is also preferably provided to enable a trader to enter a linked order on behalf of another trader within the same firm and to query the system to find information on an order she has entered on the behalf of another trader.

In a preferred embodiment, matching engine 102 may be adapted to ensure that crossed markets are not created by rejecting orders that would create such a condition. In a preferred embodiment, the system is adapted to handle FaS and FaK order types in connection with workup transactions, but FaK orders may not be matched against the FIFO bid/offer on the follow or (3) matched for the entire size. However, FaK orders that are entered into the workup market are preferably displayed in the workup market as the trader is trying to buy/sell additional size during the trade and, since this is an executable order during private and public phase, are displayed in the FIFO market as well. FaK orders preferably appear in both order books during the length of the private and public phases. An unfilled linked FaS order in FIFO preferably enters linked orders as a bid or offer in each order book.

In a preferred embodiment, the system is adapted to provide "first and third" functionality (an order that gets broken down into two or more pieces) and to process such orders against both order books. First and third orders occur when a trader enters an order and then increases the size of the order after others have joined the trade or offered along. If the trader increases the size of the order during the private phase of the workup, the trader preferably remains at the top of the queue and the entire order retains its status as number one in the queue. If, however, the trader increases the order during the public phase, the order is broken into two pieces. If this occurs, after a partial execution, all of the remaining size of the order is moved to the top of the queue for the workup owner who is working first and third orders. After a partial trade, a second buyer or seller wishing to trade the balance will not wait on the workup owner.

As those skilled in the art will recognize, it is possible in the present system for multiple price levels to trade simultaneously in the FIFO and workup markets. For example, if a bid gets hit in the workup order book for the total size, a bid at a lower level in the FIFO order book is free to trade and can be hit while the other higher level is still trading in workup.

In a preferred embodiment, minimum hold times are established for submitted orders. The minimum hold time can preferably be overridden by the linked orders functionality when one of the orders is either traded or removed from the system. This would have an impact on those using FIFO rules while running a pricing model or hedging tool. For example, Trader A inputs a linked order bid for a particular instrument with a minimum hold time of five seconds. This order is placed in both the FIFO and workup order books. One second after Trader D's order is placed in the order books, Trader B places an offer for the instrument in the FIFO order book and this order is matched with Trader D's bid. Trader D's order is removed from the workup order book although it is still subject to the order minimum hold time. Preferably, however, the system will not always override the minimum hold time. If in the previous example, there had been a higher ranked bid in the FIFO order book, but not the workup order book, Trader D's bid in the FIFO order book would not be subject to the minimum hold time. The order in the workup order book, however, would still be subject to the minimum hold time.

In a preferred embodiment, all bids and offers are clear to trade when entered. In an alternative preferred embodiment, clearing time functionality may be provided. If hidden size capability is provided, all shown size preferably trades first and first buyers, sellers' added and hidden size takes priority over the rest of the stack.

Orders may preferably be deleted during either the public or private phase of a workup. Participants that place orders that are queued in a work-up trading session and are waiting for the order to trade based on the rules of the work-up protocol may preferably cancel the orders at any time. Additional buy and sell orders may preferably be entered during the workup by original participants and others wishing to enter the trade. All of these orders are preferably converted to the workup price during the trade. New bids and offers may also preferably be entered at levels above and below the workup price, but new bids and offers at the workup price are preferably prevented from being entered during this phase.

Preferably, initial executions for partials and whole size, if executed in FIFO trading, will not flash on either the FIFO or workup display pages. Executions for more than the shown size preferably leave a stored follow in FIFO trading and create a flash in workup trading.

It should be noted that although certain of the order processing algorithms have been illustrated in accordance with an integrated order book embodiment and others with separate workup and FIFO order books, those skilled in the art will recognize that the order processing functionalities described may be achieved with either order book configuration by storing appropriate preference information for each resting order.

While the invention has been described in conjunction with specific embodiments, it is evident that numerous alternatives, modifications, and variations will be apparent to those skilled in the art in light of the foregoing description.

The invention claimed is:

1. An interface to a central computer system for facilitating electronic trading of a financial instrument by a trader in accordance with a plurality of trading protocols, comprising:

a first display area for listing a first set of said financial instrument in accordance with said trader's preferred trading protocol, said trading protocol being one of the workup protocol or a FIFO protocol, said first set of financial instrument being maintained with a first order book controlled by said central computer system; and a second display area for listing a second set of said financial instrument in accordance with said trader's alternative trading protocol, said trading protocol being the other of the workup protocol or the FIFO protocol, said second set of financial instrument being maintained with a second order book controlled by said central computer system;

said first order book and said second order book being physically or logically separated by said computer system and said first set of said financial instrument and said second set of said financial instrument comprising a pool of said financial instrument.

2. The interface of claim 1, wherein a trader using any one of said plurality of trading protocols can use either said first display or said second display to trade any one of said financial instrument.

3. The interface of claim 1, wherein said trader may configure said first display area or said second display area to display information based on a workup protocol, a FIFO protocol, or both protocols.

4. The interface of claim 1, wherein said first display area is configured according to a workup protocol and wherein said first display area provides a signal to said trader when an order enters a private phase of said workup protocol.

5. The interface of claim 1, wherein said first display area is configured according to a workup protocol and wherein said first display area provides a signal to said trader when an order is executed under a FIFO protocol that exceeds an original order size.

* * * * *